United States Patent
Baruch et al.

[11] Patent Number: 6,157,968
[45] Date of Patent: Dec. 5, 2000

[54] INTERFACE WITH SELECTOR RECEIVING CONTROL WORDS COMPRISING DEVICE IDENTIFIERS FOR DETERMINING CORRESPONDING COMMUNICATIONS PARAMETER SET FOR INTERFACE PORT TRANSFER OF DATA WORDS TO PERIPHERAL DEVICES

[75] Inventors: Ezra Baruch, Karkur; Yaron Gold, Kadima, both of Israel; Sanjay Wanchoo, Lauderhill, Fla.; William C. Moyer, Dripping Springs, Tex.

[73] Assignee: Motorola Inc., Schaumburg, Ill.

[21] Appl. No.: 09/013,177

[22] Filed: Jan. 26, 1998

[51] Int. Cl.[7] .............................. G06F 3/00; G06F 13/12; G06F 13/38; H04L 12/16; H04Q 11/00
[52] U.S. Cl. .............................. 710/20; 710/1; 710/4; 710/5; 710/11; 710/21; 710/72; 364/260
[58] Field of Search ................................ 395/824, 825, 395/275, 840, 841, 821, 831, 892; 364/239, 260, 260.1; 710/5, 20, 21, 1, 4, 11, 72

[56] References Cited

U.S. PATENT DOCUMENTS

| | | | |
|---|---|---|---|
| 4,601,586 | 7/1986 | Bahr et al. | 370/94 |
| 4,816,996 | 3/1989 | Hill et al. | 710/5 |
| 4,942,540 | 7/1990 | Black et al. | 709/228 |
| 4,958,277 | 9/1990 | Hill et al. | 710/52 |
| 4,975,828 | 12/1990 | Wishneusky et al. | 710/11 |
| 5,283,872 | 2/1994 | Ohnishi | 710/129 |
| 5,301,275 | 4/1994 | Vanbuskirk et al. | 395/250 |
| 5,307,463 | 4/1994 | Hyatt et al. | 395/275 |
| 5,379,298 | 1/1995 | Saiki et al. | 370/79 |
| 5,414,815 | 5/1995 | Schwede | 710/26 |
| 5,497,501 | 3/1996 | Kohzono et al. | 710/129 |
| 5,539,914 | 7/1996 | Fry et al. | 395/827 |
| 5,544,329 | 8/1996 | Engel et al. | 395/826 |
| 5,613,138 | 3/1997 | Kishi et al. | 712/18 |
| 5,717,949 | 2/1998 | Ito | 710/4 |
| 5,805,922 | 9/1998 | Sim et al. | 710/5 |
| 5,890,014 | 3/1999 | Long | 710/8 |
| 5,901,070 | 5/1999 | Trainor | 364/528 |
| 5,951,654 | 9/1999 | Avsan et al. | 710/5 |
| 5,995,016 | 11/1999 | Perino | 340/825.52 |

OTHER PUBLICATIONS

Hardware Adapter Configuration—IBM Technical Disclosure Bulletin vol. 31, No. 12, May 1989, p. 344.
"Queued Serial Module (QSM) Reference Manual" by Motorola, Inc. 1991, order No. QSMRM/AD.

*Primary Examiner*—Thomas C. Lee
*Assistant Examiner*—Tanh Nguyen

[57] ABSTRACT

A computer system (100) comprises a processor (110), a memory (300), an interface (101) and peripheral devices (120-1, 120-2, 120-3). The interface has a pointer generator (160), a port (150), a decoder (170), and a parameter register (180). The port (150) transmits data words D(k) (380-k) from the memory (300) to the peripheral devices (120-1, 120-2, 120-3) or vice versa. Communication parameters are stored as parameter sets $\{P_m\}$ in parameter fields (185-m) of the parameter register (180). The decoder (170) selects a parameter set $\{P_i\}$ using from control words C(k) stored in the memory (300). Data queues can simultaneously be transmitted to two or more peripheral devices (120-1, 120-2, 120-3).

10 Claims, 4 Drawing Sheets

INTERFACE WITH SELECTOR RECEIVING CONTROL WORDS COMPRISING DEVICE IDENTIFIERS FOR DETERMINING CORRESPONDING COMMUNICATIONS PARAMETER SET FOR INTERFACE PORT TRANSFER OF DATA WORDS TO PERIPHERAL DEVICES

FIELD OF THE INVENTION

The present invention generally relates to computer systems and, more particularly to interfaces for data communication used in such systems. The present invention also relates to a method for operating such systems.

BACKGROUND OF THE INVENTION

Computer systems (e.g., integrated microcomputers) comprise processors (e.g., a central processing unit CPU), memory units (e.g., a random access memory RAM), busses, and other components. Interfaces exchange data and control information between these components and peripheral devices (e.g., displays, printers, buzzers). For example, the processor writes data to the memory and the interface sends this data to the peripheral device, or vice versa. To save processor resources, it is convenient to control the interface partly or completely independent from the processor.

A queued serial peripheral interface unit (QSPI) is incorporated in many microcomputers and peripherals. The following references are useful: U.S. Pat. No. 4,816,996 [1] and 4,958,277 [2], both to Hill et al., and "Queued Serial Module (QSM) Reference Manual" by Motorola, Inc. 1991, order number QSMRM/AD, hereinafter [3]. A queue is a plurality of memory entries which are consecutively retrieved from the memory or written into the memory.

Section 4 of reference [3] explains communications parameters, such as for example, serial clock baud rate SPBR, bits per transfer BITS, length of delay after transfer DTL, clock polarity CPOL, clock phase CPHA, and others. All communication parameters needed for transmitting a queue are collectively referred to as parameter set. The CPU defines the parameter set for every queue and writes the parameters of the required set to control registers. When a new queue is activated, the CPU writes a new parameter set to the control register. In other words, the parameters are associated with the queues. The software designer who designs CPU instructions has to take care for each communication parameter. This approach is cost intensive and not convenient. Also, during a queue transfer, the parameter set can not be modified. It is sometimes desirable to begin a queue transfer with a first parameter set and switch to a second parameter set. Using the QSPI described in references [1], [2] and [3] a queue transfer should be stopped and initiated again with newly loaded communication parameters.

The present invention seeks to provide a computer system with an improved interface and a method which mitigate or avoid these and other disadvantages and limitations of the prior art.

DETAILED DESCRIPTION OF A PREFERRED EMBODIMENT

The present invention is explained in connection with an improved QSPI, but this is not limiting. Those of skill in the art are able, based on the description herein, to apply the present invention to other interfaces without departing from the scope of the present invention.

According to the present invention, parameter sets are associated with the peripheral devices. Advantages over the prior art are, for example, as follows: (a) Multiple peripheral devices which require different parameters can be served by a single queue. (b) The CPU less often interferes with the interface. (c) The memory can be organized more flexible.

Figure 1:
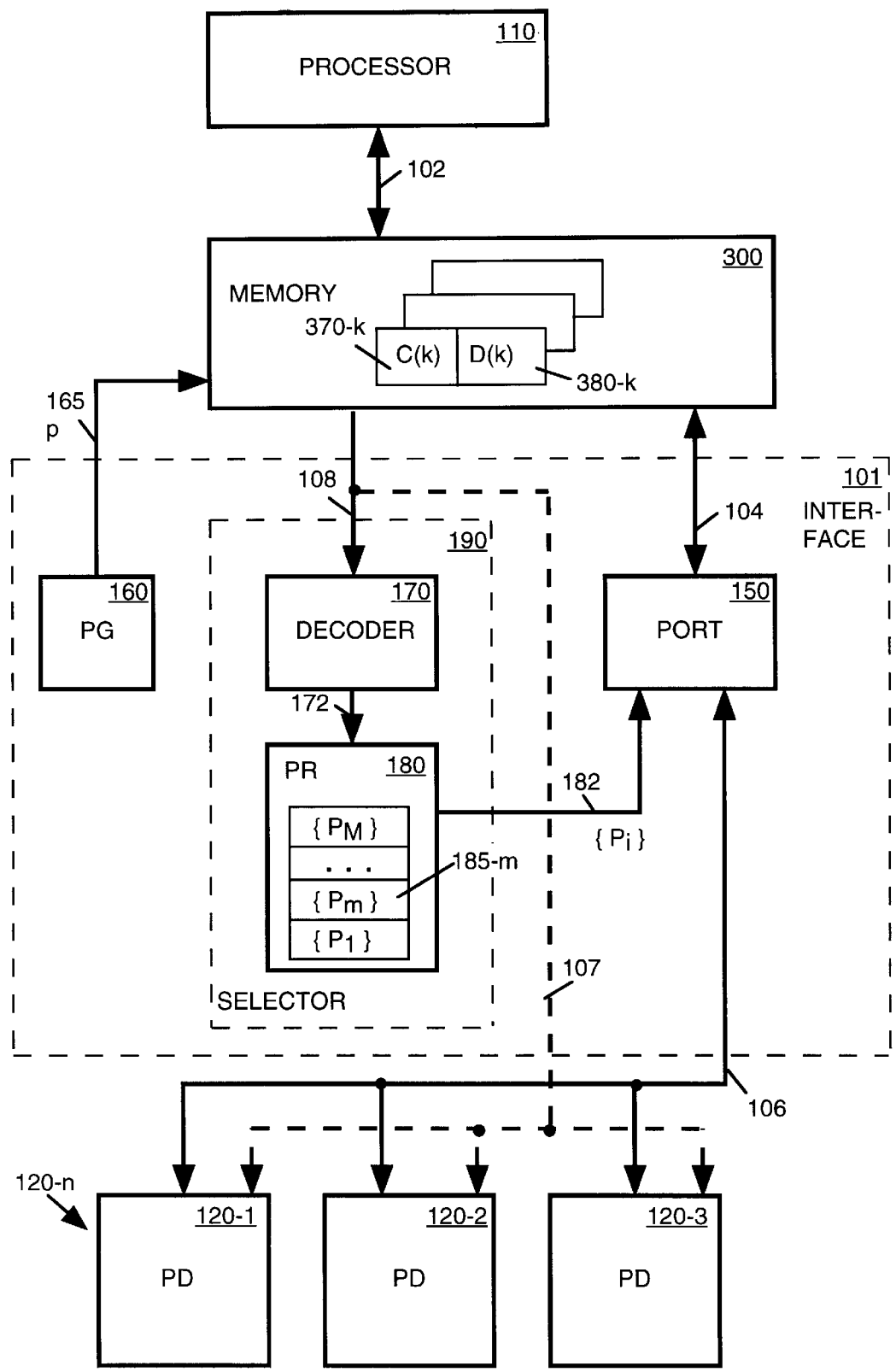
FIG. 1 is a simplified block diagram of a computer system according to the present invention.

FIG. 1 is a simplified block diagram of computer system 100 according to the present invention. System 100 comprises processor 110, memory 300, data interface 101 (hereinafter interface 101, dashed line), and N devices 120-n (n=1 to N). Devices 120-n are, preferably, peripheral devices (PD). For simplicity, FIG. 1 illustrates N=3 devices 120-1, 120-2, and 120-3. A convenient number for N is N=16, but other configurations with larger or smaller N are also possible.

Interface 101 comprises port 150, pointer generator (PG) 160, decoder 170, and parameter register (PR) 180. Decoder 170 and parameter register 180 form selector 190 (dashed frame). Processor 110 is coupled to memory 300 via bi-directional data path 102; memory 300 is coupled to port 150 of interface 101 via bi-directional data path 104; memory 300 is also coupled to decoder 170 via control path 108; port 150 of interface 101 is coupled to devices 120-n via communication path 106. Optional select line 107 (dashed) is coupled between path 108 and devices 120-n. In interface 101, decoder 170 is coupled to parameter register 180 via line 172; and parameter register 180 is coupled to port 150 via line 182. Pointer generator 160 has pointer p (illustrated by line 165) to memory 300. Parameter register 180 has fields 185-m (m=1 to M) for storing M predetermined parameter sets:

$$\{P_1\}, \{P_2\}, \ldots \{P_m\}, \{P_M\}. \tag{1}$$

Symbols { } indicate that each set comprises a plurality of parameters, such as the above mentioned SPBR, DTL, CPOL, CPHA, and other parameters. Arrows at paths 102, 104, 106 and 108 and at lines 107, 165, 172, 182 indicate a preferred signal flow. Preferably, memory 300 has K fields 370-k (e.g., k=0 to K−1) for storing control words C(k) and K fields 380-k (k=1 to K) for storing data words D(k). Preferably, path 102 is intended to carry data words D(k) and control words C(k); path 104 carries data words D(k) and path 108 carries control words C(k). This distinction is convenient but not essential for the present invention. Details for memory 300 are explained in connection with FIG. 3. Data words D(k) and control words C(k) which are accessed by pointer p, are referred to as D(p) and C(p), respectively. Preferably, pointer p points simultaneously to one D(p) in field 380-p (p=k) and to one C(p) in field 370-p (p=k).

Port 150 is, preferably, a serializer which transfers data words D(k) from parallel form in memory 300 to data words in serial form on communication line 106. Or vice versa, port 150 transfers serial data words from line 106 to data words D(k) in memory 300. A serializer is described in references [1] and [2]. Port 150 can be modified by a person of skill in the art. For example, port 150 can also keep the parallel data form. Or, port 150 can transform serial data from memory 300 to parallel data on communication path 106. Port 150 can also transfer control words C(k).

According to the present invention, pointer generator 160 moves pointer p to data words D(k) and control words C(k) which belong to a queue. Some or all of control words C(k) comprise device identifiers. Selector 190 continuously receives control words C(p) via path 108, analyses the device identifiers according to logical relations and temporarily sends a selected parameter set $\{P_i\}$ to port 150. Index i (e.g., $1 \leq i \leq M$) stands for the selection. This convention is also used for selected devices 120-j. Then, port 150 transfers data words D(p) to all devices 120-n or to some devices 120-n. Preferably, port 150 uses selected parameter set $\{P_i\}$ as long as selector does not determine a new parameter set $\{P_i\}'$ (the prime marker for "new").

A selected device 120-j is preferably, enabled by line 107; and a device 120-n which is not selected is, preferably, disabled by line 107. Index j (e.g., $1 \leq j \leq N$) stands for the selection. Line 107 can be implemented by a bus with, e.g., $\log_2 N$ partial lines (logarithm to the base 2) or by other means well known in the art.

Parameter register 180 stores parameter sets $\{P_m\}$ substantially permanently. This includes that parameter sets can also be modified by, e.g., processor 110. Decoder 170 can be implemented, for example, by a look-up table or a logical network with, for example, and-gates, or-gates, inverter gates and combinations thereof. Preferably, decoder 170 selects the parameter sets according to predefined logical relations.

Figure 2:
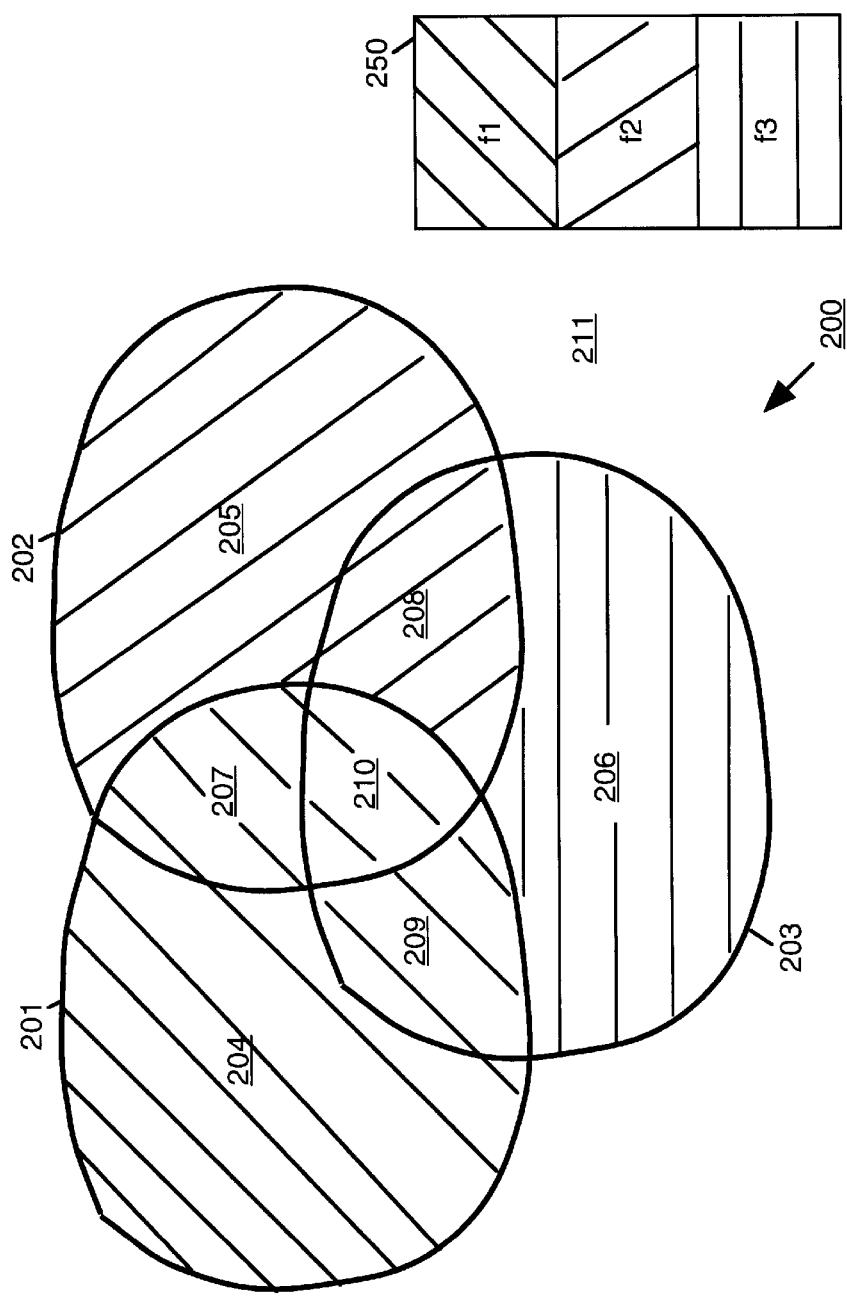
FIG. 2 is a simplified selection diagram for peripheral devices which are part of the computer system of FIG. 1.
Figure 3:
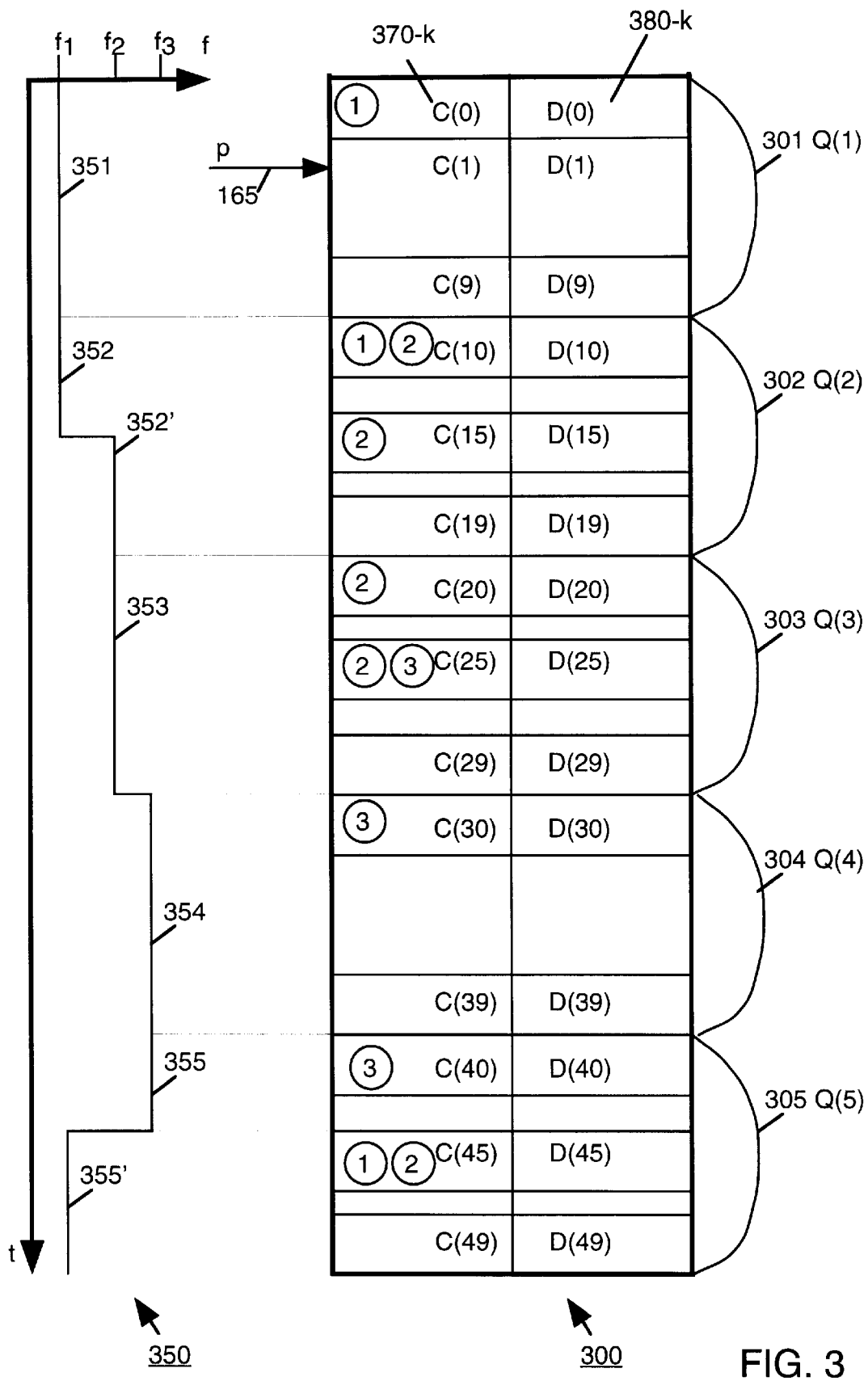
FIG. 3 is a simplified block diagram of a memory which is part of the computer system of FIG. 1.

FIGS. 1–3, for purposes of clarity, do not include certain details which persons of skill in the art understand are required in an actual system. For example, some control paths by which a controller such as a CPU (e.g., processor 110) would control the operation of system 100 are not shown. These will be apparent from the further description below. In general, there are many possible ways to implement the logical functions of system 100 in hardware and the figures are only intended for purposes of illustration. Persons of skill in the art will understand how to implement system 100 based on the description herein.

FIG. 2 is a simplified selection diagram for peripheral devices 120-n (e.g., n=1 to N=3) of computer system 100 of FIG. 1. Diagram 200 illustrates N=3 ring-shaped graphs 201, 202 and 203 each indicating the selection of devices 120-1, 120-2, and 120-3, respectively. Diagram 200 gives information about the status of system 100. Such diagrams are well known in the art under the terms "Venn-diagram" or set-diagram. Graphs 201–203 cross each other and give the borders of M' areas 204, 205, 206, 207, 208, 209, and 210. An additional area 211 is located outside of graphs 201–203 and stands for "no selection". The number M' of areas (without area 211) is calculated as:

$$M' = 3^2 - 1 = 7 \quad (2)$$

$$M' = N^2 - 1 \quad (3)$$

with the superscript "2" standing for power of "2". In other words, N devices 120-n can be active to exchange data with port 150 in M' different combinations. For example, area 204 symbolizes that only device 120-1 is selected, and that devices 120-2 and 120-3 are not selected. Area 207 stands for devices 120-1 and 120-2, but not 120-3, and so on.

The number M of parameter sets is equal to or smaller than the number M' of possible combinations:

$$M \leq M' \quad (4)$$

For convenience, the parameter sets $\{P_m\}$ are explained for a single communication parameter "transfer frequency f" only. A person of skill in the art is able, based on the description herein, to apply the present invention to parameter sets with more communication parameters. Some devices 120-n might have non compatible communication parameters, such as, for example, the clock polarity.

Assume that communication line 106 is a single-bit line. The transfer frequency f is defined as the bit rate on line 106 by which data words D(p) are exchanged between any selected device 120-j and port 150. Different devices 120-n accommodate different transfer frequencies $f_n$. One device operates faster than another device and vice versa. For example, device 120-1 could be the slowest operating device and device 120-3 could be the fastest device. Transfer frequencies $f_n$ for devices 120-n are, for example:

$$f_1 < f_2 < f_3 \quad (5)$$

but other relationships can also apply. Convenient values for $f_n$ are given in table 4-3 of reference [3] under the term "Actual SCK frequency". The following assumptions are also made:

Device 120-2 operates not only at $f_2$, but also at $f_1$     (6)

Device 120-3 operates not only at $f_3$, but also at $f_1$ and $f_2$.     (7)

In FIG. 2, legend 250 indicates different hatching for $f_1$ (areas 204, 207, 209, 210) $f_2$ (205, 208), and $f_3$ (206). For example, when devices 120-n are selected as given in area 208 (devices 120-2 and 120-3), then the transfer frequency is $f_2$. In the example, M=3 parameter sets are:

$$\{P_1\} = f_1;$$

$$\{P_2\} = f_2; \text{ and}$$

$$\{P_3\} = f_3. \quad (8)$$

FIG. 3 is a simplified block diagram of memory 300 of computer system 100 of FIG. 1. FIG. 3 also shows a simplified transfer frequency-time diagram 350. In the example of FIG. 3, memory 300 is illustrated with K=50 fields 370-k (k=0 to K−1) storing control words C(0) to C(49) and with K=50 fields 380-k storing data words D(0) to D(49). Pointer p (165) is given as e.g., p=1, and points to control word C(1) and data word D(1).

For example, C(0) and D(0) to C(9) and D(9) form data queue Q(1) (in short "queue", reference number 301); C(10) and D(10) to C(19) and D(19) form queue Q(2) (302); C(20) and D(20) to C(29) and D(29) form queue Q(3) (303); C(30) and D(30) to C(39) and D(39) form queue Q(4) (304); and C(40) and D(40) to C(49) and C(49) form queue Q(5) (305). For convenience of explanation, it is assumed that queues Q(1) to Q(5) are transferred to devices 120-n consecutively, beginning with Q(1). Some of control words C(k) has device identifiers ①, ② and/or ③ for devices 120-1, 120-2, and 120-3, respectively. At the beginning of queue Q(1), ① in C(0) indicates the selection of device 120-1. Similarly, ① and ② in C(10) indicate the selection of devices 120-1 and 120-2 for the beginning of queue Q(2). ② in C(15) indicates that the transfer of queue Q(2) should be continued to device 120-2, but not continued to device 120-1. ② in C(20) assigns device 120-2 to queue Q(3). ② and ③ in C(25) illustrate that during the transfer of queue Q(3), device 120-3 is additionally selected. ③ in C(30) indicates that data of queue Q(4) goes to device 120-3. Queue Q(5) is initially transferred only to device 120-3 (③ in C(40)) and later transferred to devices 120-1 and 120-2 (① and ② in C(45)).

The selection of devices 120-n has influence on the transfer frequency f. Transfer frequency-time diagram 350 has a vertical time axis t (going down the page) and a horizontal frequency axis f with transfer frequencies $f_1$, $f_2$, and $f_3$. An actual transfer frequency is given by traces 351 during transfer of Q(1), 352 and 352' (Q(2)), 353 (Q(3)), 354 (Q(4)), and 355, 355' (Q(5)). For convenience, the time can be measured by pointer p. Port 150 initially (i.e., p=0 to p=14) operates at frequency $f_1$. At p=15, port 150 can speed up to $f_2$; at p=30 port 150 can further speed up to $f_3$; but at p=45 port 150 speeds down to $f_1$ again.

In other words, during certain times of operation (e.g., p=10 to p=14), system 100 serves at least a first device (e.g., 120-1) and a second device (e.g., 120-2). The parameter sets $\{P_m\}$ stored in parameter register 180 comprises a set (e.g., $\{P_1\}$) which has communication parameters (e.g., transfer frequency $f_1$) which are accommodated by the first and the second device at substantially the same time (e.g., any time of p=10, p=11, p=12, p=13, and p=14).

Also, system 100 transfers data words D(k) within queue boundaries (e.g., queue Q(2) between C(10)/D(10) and C(19)/D(19)). The queue (e.g., Q(2)) has a control word (e.g., C(15)) which causes selector 190 to select a new parameter set (e.g., $\{P_2\}$ instead of $\{P_1\}$) while the queue transfer (of e.g., Q(2) is continuing (e.g., between p=10 and p=19).

The new parameter set can have such communication parameters that additional devices 120-n can be served, or that fewer devices 120-n can be served. For example, at p=15, selector 190 switches from set $\{P_1\}$ (low frequency $f_1$) to set $\{P_2\}$ (higher $f_2$). Device 120-1 is no longer served, but data queue Q(2) remains the same. Or, during the transfer of Q(5), control word C(45) identifies devices 120-1 and 120-2 (①and ②) instead of device 120-3 so that selector 190 switches from parameter set $\{P_3\}$ (high frequency $f_3$) to parameter set $\{P_1\}$.

Figure 4:
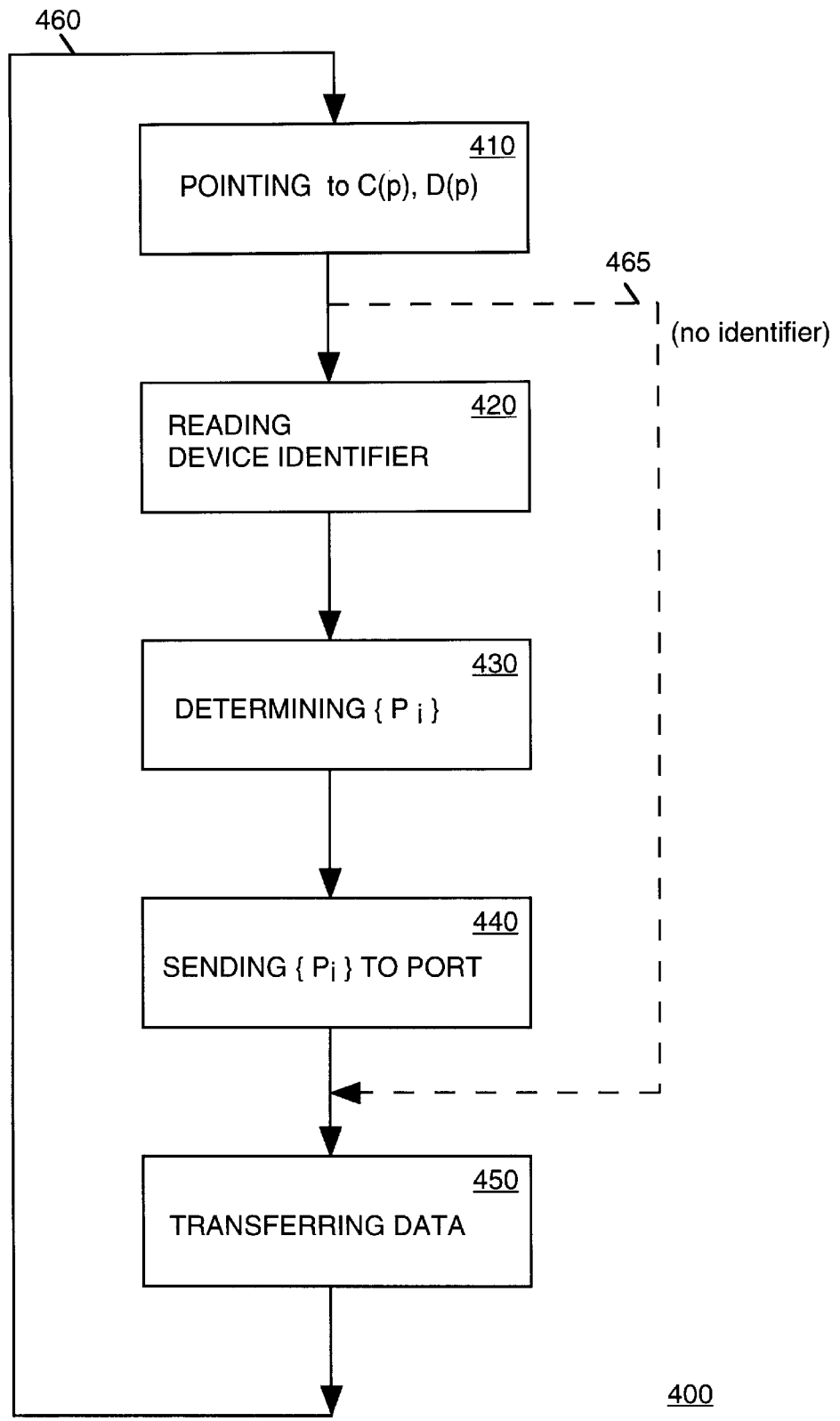
FIG. 4 is a simplified flow chart diagram of a method according to the present invention.

FIG. 4 is a simplified flow chart diagram of method 400 according to the present invention. Method 400 is, preferably, performed by system 100 of the present invention. References to the components 110, 300, 160, 170, 150, 180, and 120-n of system 100 are provided only for convenience of explanation. Those of skill in the art, are able, based on the description herein, to apply method also to other systems. Method 400 comprises step 410 for pointing to a queue entry, step 420 for reading a device identifier (e.g., ① ② ③), step 430 for determining a parameter set $\{P_i\}$, step 440 for sending the parameter set $\{P_i\}$ to port 150; and step 450 for transferring data. Steps 410, 420, 430, 440, and 450 are, preferably, performed consecutively and periodically repeated (line 460). Arrows between the steps illustrate a preferred method flow. Details are as follows:

(a) In step 410, pointer generator 160 generates pointer p which points to a control word C(p) and to a data word D(p) (collectively "queue entry"). It is known in the art how to determine queue boundaries by e.g., predetermined start and end values for pointer p or by other means.

(b) In step 420, decoder 170 reads at least one device identifier (e.g., ①) for device 120-1) from control word C(p) for devices of the plurality of N devices 120-1 to 120-N. Control word C(p) may have no device identifier. Preferably, the device identifier is part of control word C(p). Optionally C(p) can have other information, which is not essential to practice the present invention.

(c) In step 430, decoder 170 determines a parameter set $\{P_i\}$ (selected set) from the plurality of predetermined parameter sets $\{P_1\}$ to $\{P_M\}$ stored in parameter register 180. Thereby, decoder 170 uses the device identifiers of the previous step. If there are two or more device identifiers (e.g., ① and ② at p=10), for two or more devices 120-n (e.g., devices 120-1 and 120-2) then decoder determines the parameter set $\{P_i\}$ which accommodates all identified devices 120-n. For example, parameter $\{P_1\}=f_1$ accommodates devices 120-1 and 120-2. The parameter set $\{P_i\}$ is selected out of $M \geq N$ predetermined parameter sets $\{P_1\}$ to $\{P_M\}$.

(d) In step 440, decoder 170 tells parameter register 180 via line 172 which one is the selected parameter set $\{P_i\}$. Parameter register 180 sends $\{P_i\}$ with its parameters to port 150 via line 182. It is not important for the present invention, whether the parameters goes through line 182 simultaneously in parallel or consecutively.

(e) In step 450, port 150 transfers data word D(p) to device 120-n identified (selected) by the device identifier. If two or more devices are selected, then port 150 transfers data word D(p) to all of the selected devices substantially simultaneously. In such a case, the communication parameters (e.g., $f_n$) are common for all selected devices 120-n.

(f) As indicated by repetition line 450, steps 410–450 are repeated. Dashed line 465 from the end of step 410 to 450 illustrates an optional method flow when control word C(p) does not have a device identifier. The performance of method 400 can be accelerated by conditionally leaving out steps 420, 430, and 440. This is a convenient modification of method 400 which can be implemented by persons of skill in the art which apply the present invention based on the description herein.

Method 400 can be modified without departing from the scope of the present invention. For example, if in step 420 decoder 170 does not find an identifier, than decoder 170 takes the identifier from a previous execution of step 420.

While the invention has been described in terms of particular structures, devices and methods, those of skill in the art will understand based on the description herein that it is not limited merely to such examples and that the full scope of the invention is properly determined by the claims that follow.

What is claimed is:

1. A computer system with an interface between a memory and devices to transfer data queues stored in said memory, said interface comprising:

a pointer generator for moving a pointer p to data words D(p) and control words C(p) of said queues, wherein said control words C(p) comprise device identifiers each device identifier identifying one of said devices;

a port coupled to said memory and to said devices, said port for transferring said data words D(p) to said devices using communication parameters for said port according to a selected parameter set;

a selector coupled to said memory and to said port, said selector having attached therein M parameter sets for said port, said selector for receiving said control words C(p) from said memory and for determining said selected parameter set according to said device identifiers in said control words.

2. The computer system of claim 1 wherein said selector has a decoder coupled to a parameter register which stores said parameter sets, said decoder receiving said control words C(p) and determining said selected parameter set.

3. The computer system of claim 1 wherein said port is coupled to $N \leq M$ devices.

4. A computer system with an interface between a memory and devices to transfer data queues stored in said memory, said interface comprising:

a pointer generator for moving a pointer p to data words D(p) and control words C(p) of said queues, wherein said control words C(p) comprise device identifiers;

a port coupled to said memory and to said devices, said port for transferring said data words D(p) to said devices according to a selected parameter set;

a selector coupled to said memory and to said port, said selector having attached therein M parameter sets for said port, said selector for receiving said control words C(p) from said memory and for determining said selected parameter set according to said device identifiers in said control words, wherein said devices are first and second devices and wherein said parameter sets comprise a set which has communication parameters allowing to transfer data between said first and second devices and said memory at substantially the same time.

5. A computer system with an interface between a memory and devices to transfer data queues stored in said memory, said interface comprising:

a pointer generator for moving a pointer p to data words D(p) and control words C(p) of said queues, wherein said control words C(p) comprise device identifiers;

a port coupled to said memory and to said devices, said port for transferring said data words D(p) to said devices according to a selected parameter set;

a selector coupled to said memory and to said port, said selector having attached therein M parameter sets for said port, said selector for receiving said control words C(P) from said memory and for determining said selected parameter set according to said device identifiers in said control words, wherein said port transfers data words within queue boundaries, said queue having a control word causing said selector to select a new selected parameter set while the queue transfer is continuing.

6. A method for transferring a queue from a memory to one or more peripheral devices, said method comprising the steps of:

(a) pointing to a queue entry, wherein a pointer generator p points to a data word D(p) and to a control word C(p) of said queue entry;

(b) reading a first device identifier from said queue entry, wherein said device identifier is part of said control word;

(c) determining a first parameter set for a port from a plurality of predetermined parameter sets by using said first device identifier;

(d) sending said first parameter set to said port;

(e) transferring a data word of said queue entry to a first device which has been identified by said first device identifier using said first parameter set; and (f) repeating said steps (a) to (e) for further queue entries.

7. The method of claim 6 wherein in said step (b) said device identifier identifies the peripheral device from a plurality of N peripheral devices, and wherein in said step (c) said first parameter set is selected from plurality of M≧N predetermined parameter sets.

8. The method of claim 6 wherein in said step (c) said first parameter set is determined by a first identifier obtained by step (b) previously executed.

9. A method for transferring a queue from a memory to one or more peripheral devices, said method comprising the steps of:

(a) pointing to a queue entry;

(b) reading a first device identifier from said queue entry and reading a second device identifier from said queue entry;

(c) determining a first parameter set from a plurality of predetermined parameter sets by using said first device identifier and said second device identifier such that said first parameter accommodates said first peripheral device and said second peripheral device;

(d) sending said first parameter set to a port;

(e) transferring a data word of said queue entry to a first device which has been identified by said first device identifier using said first parameter set; and (f) repeating said steps (a) to (e) for further queue entries.

10. A method for transferring a queue from a memory to one or more peripheral devices, said method comprising the steps of:

(a) pointing to a queue entry;

(b) reading a first device identifier and a second device identifier from said queue entry;

(c) determining a first parameter set from a plurality of predetermined parameter sets by using said first device identifier, wherein said first parameter set has communication parameters which are common for a first peripheral device identified by said first device identifier and a second peripheral device identified by said second peripheral identifier;

(d) sending said first parameter set to a port;

(e) transferring a data word of said queue entry to a first device which has been identified by said first device identifier using said first parameter set; and (f) repeating said steps (a) to (e) for further queue entries.

* * * * *

UNITED STATES PATENT AND TRADEMARK OFFICE
CERTIFICATE OF CORRECTION

PATENT NO. : 6,157,968
DATED : December 5, 2000
INVENTOR(S) : Ezra Baruch et al.

It is certified that error appears in the above-identified patent and that said Letters Patent is hereby corrected as shown below:

Claim 1, column 6,
Line 55, after "set", insert -- and --

Claim 4, column 7,
Line 9, after "set;" insert -- and --

Claim 5, column 7,
Line 30, after "set;" insert -- and --
Line 34, change "C(P)" to -- $C_{(P)}$ --

Claim 7, column 8,
Line 11, after "from" insert -- a --

Signed and Sealed this

Thirtieth Day of October, 2001

Attest:

NICHOLAS P. GODICI
*Attesting Officer*   *Acting Director of the United States Patent and Trademark Office*